United States Patent [19]

Barbieri

[11] 3,924,121

[45] Dec. 2, 1975

[54] PROCESS AND APPARATUS FOR UNDERCOMPENSATING PHOTOGRAPHIC COLOR PRINTING

[75] Inventor: Siegfried Barbieri, Brixen, Italy

[73] Assignee: Durst AG. Fabrik Fototechnischer Apparate, Bolzano, Italy

[22] Filed: Jan. 21, 1974

[21] Appl. No.: 435,249

[30] Foreign Application Priority Data

Jan. 26, 1973 Italy ................................... 4807/73

[52] U.S. Cl. ............. 250/226; 250/205; 250/214 P; 355/38; 356/175
[51] Int. Cl.² ....................... G03B 27/78; G01J 3/34
[58] Field of Search ................ 250/205, 226, 214 P; 355/38, 68; 356/173, 175

[56] References Cited
UNITED STATES PATENTS

| | | | |
|---|---|---|---|
| 3,083,614 | 4/1963 | Veit | 250/205 X |
| 3,588,246 | 6/1971 | July | 356/173 X |
| 3,591,375 | 7/1971 | Neale | 355/38 X |
| 3,601,485 | 8/1971 | Barbieri | 355/38 |
| 3,609,038 | 9/1971 | Kolshorn | 355/68 |
| 3,640,620 | 2/1972 | Shatz et al. | 355/38 |

*Primary Examiner*—Walter Stolwein
*Attorney, Agent, or Firm*—Connolly and Hutz

[57] ABSTRACT

Undercompensated photographic color printing is accomplished in a light integrating system by impinging substantially white light in which the ratio of the primary color components is predetermined, independent of the color content of any particular transparency, onto the measuring head which controls the termination of the exposures to each of the primary color components in the printing light. Servo control and charge storing circuits control the color content and intensity of the supplemental light. The ratio of printing and supplemental light impinged on the measuring head is adjusted by variable interposition of neutral gray wedges in the path of the emitted printing and supplemental light.

26 Claims, 1 Drawing Figure

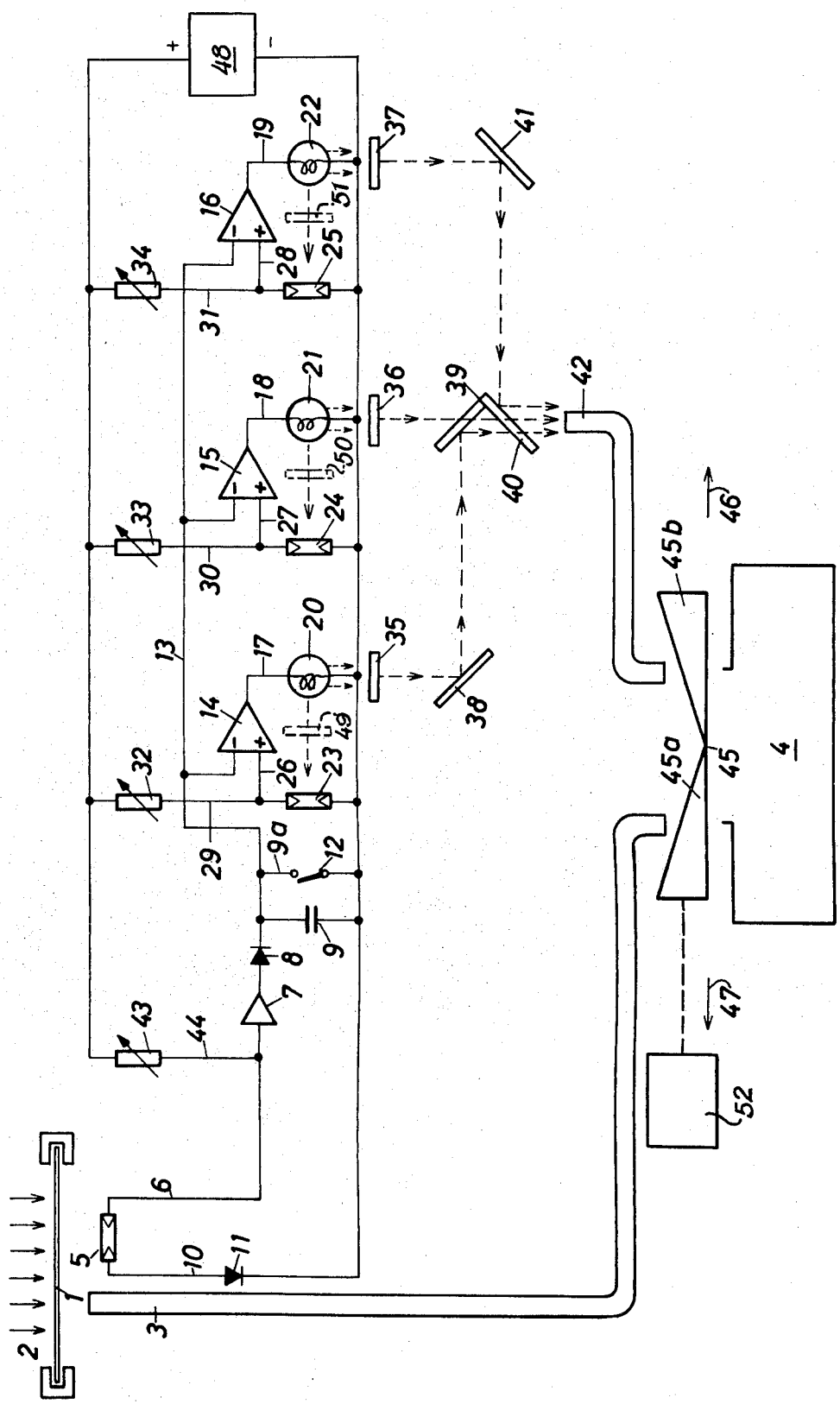

3,924,121

PROCESS AND APPARATUS FOR UNDERCOMPENSATING PHOTOGRAPHIC COLOR PRINTING

BACKGROUND OF THE INVENTION

This invention relates to a process and apparatus for making undercompensated color prints wherein the measuring of the primary color components proceeds in accordance with an integrating process. In color printing apparatus of this type, the color control for the copying light is adjusted in such a manner that the quantities of light of the three primary colors impinging on the copying material for transparencies of so-called normal objects, i.e., objects wherein the three primary colors are present in substantially equal amounts with a uniform distribution over the surface independent of the processed negative in a given case, yield a predetermined neutral density of the copying material after its developing. This so-called neutral gray compensation has the advantage that such deviations in the transparencies may be corrected which occur from errors in the exposure or in the processing procedure.

Color controlling devices which function accordingly have the disadvantage, however, that they cannot take into account actual color distribution unbalances in the integration of the copy. When strong colors are dominant in the exposed motif, the neutral gray compensation leads to unsatisfactory copies, since these actually dominant colors are equalized to the predetermined gray density and thus are improperly suppressed.

In practice, it has been shown that it is possible to prepare suitable copies from most of such correctly exposed transparencies having unbalanced color content if an incomplete color compensation is carried out, which normally would be considered as undercompensation with over or underexposed negatives of normal objects, without having to incur a considerable quality loss on the gradation of color shades, which otherwise would be suppressed in such a procedure.

Experience has shown that an undercompensation between 10 and 50 percent for printing amateur photography work yields the highest number of suitable copies. However, if professional portrait exposures having balanced color content are processed, usually no undercompensation is required.

From the various instances of application, of which only two have been mentioned, there results the necessity, therefore, of continuously regulating in a wide range the extent of the undercompensation.

In a previously known process, an undercompensation is achieved in that to the photoelectric current of the light sensitive elements, which serve for measuring the color constituents, there is added a supplementary electric current, depending on the desired extent of undercompensation measured from the particular transparency being printed, which thus additionally influences the charge of the storage capacitors on which depends the control of the light terminating filters.

Such addition of current to the photoelectric current, however, becomes difficult because these photoelectric currents have very small values and the corresponding circuits have a high ohmic resistance which necessarily requires highly sensitive and expensive controls. In addition, with such a process, a subsequent outfitting of color copying apparatus with an undercompensation device is only possible with great difficulty. The object of this invention is, therefore, to provide a process and an apparatus for the undercompensation without the necessity of engaging the measuring circuit.

SUMMARY

It is suggested by the invention to effect the undercompensation by admixing substantially white supplemental light into the measuring light. The supplemental light has its primary color components in a predetermined ratio which is independent of the color content of any particular transparency. This undercompensates the balance of the primary color components in the colored prints relative to the predetermined amounts of the primary color components in the printing light transmitted through the transparencies. Different predetermined ratios may be established for different classes of transparencies having various actually unbalanced primary color formats, such as predominently green for forest scenes and blue for ocean or seashore scenes. Servo control and charge storing circuits may be used to control the color content and intensity of the supplemental light, and the ratio of printing and supplemental light impinged on the measuring head may be adjusted by variable blockage and transmission of the emitted printing and supplemental light.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which the single FIGURE is a schematic diagram of one embodiment of this invention.

DESCRIPTION OF THE PREFERRED EMBODIMENTS

In a photographic color printing apparatus (not fully shown) of the general type described in U.S. Pat. No. 3,127,267, a photographic transparency or negative 1 is arranged in the path of rays 2 of the copying light. Below the negative 1 is situated a light conducting conduit 3, for example a light-conducting rod which receives the measuring light and transmits it to the measuring head 4, wherein the light-sensitive elements (not shown) are accommodated. A photoconductive cell 5, equally sensitive for the blue, green and red primary color light beams, which is arranged below negative 1 in the proximity of the end of the photoconductor 3 directed toward negative 1, detects the radiation of light penetrating negative 1.

Photoconductive cell 5 is connected by conductor 6 through amplifier 7 and rectifier diode 8 with a pole of a capacitor 9 and by a conductor 10 through rectifier diode 11 with the second pole of capacitor 9.

Parallel to capacitor 9 is situated a bridging conductor 9a containing a discharge switch 12, which is closed in the off position of the copying apparatus, whereby capacitor 9 is without charge potential. At the beginning of the exposure, switch 12 is opened. Thus capacitor 9 becomes charged up to a potential which is proportional to the radiation impinging upon photoconductive cell 5. Rectifier diode 8 prevents a discharge of capacitor 9, so that capacitor 9 remains charged during the entire exposure process. Diode 11 serves for equalizing the voltage drop at diode 8. Capacitor 9 is connected by conductor 13 with the negative input to each of three differential amplifiers 14, 15, 16. At the output of amplifiers 14, 15, 16, a lamp 20, 21, 22 each is energized through conductors 17, 18, 19 with a voltage proportional to that applied to the capacitor 9. Lamps 20, 21, 22 affect with their radiation photoconductive cells 23, 24, 25 each, which are connected by conductors 26, 27, 28 with the positive inputs of the particular differential amplifiers 14, 15, 16 in servo control circuits and by conductors 29, 30, 31 with the particular potentiometers 32, 33, 34, which in turn are connected to the positive pole of power source 48. Since lamps 20, 21, 22, as further explained below, serve for the regulation of the color composition for the white light admixed to the measuring light, there may be arranged color filters 49, 50, and 51 (shown in phantom outline) between the individual lamps 20, 21, 22 and the particularly auxiliary photoconductive cells 23, 24, 25, in order that the photoconductive cells 23, 24, 25 are irradiated only by the light radiation components in a given primary color.

By means of potentiometers 32, 33, 34, the brightness of the lamps 20, 21, 22 may be individually regulated. Lamps 20, 21, 22 are each shielded by a color filter 35, 36, 37, which in a given case lets through only blue, red or green radiation energy. It is also possible to arrange the above-stated photoconductive cells 23, 24, 25 spacially in such a manner that they are disposed in the path of the light rays after they pass through filters 35, 36, 37.

The colored light rays passing through filters 35, 36, 37 are mixed by means of a combination of reflectors 38, 39, 40, 41 or in another mixing member and are conducted by means of a second photoconductor 42 to the measuring head 4, as a source of supplemental light.

By regulation of potentiometers 32, 33, 34 it is possible to produce light in any desired color composition whose intensity may be additionally regulated by means of a potentiometer 43, which is connected by means of conductor 44 with amplifier 7 and photoconductive cell 5.

Between the ends of photoconductors 3 and 42, situated in the proximity of the measuring head 4, and the measuring head 4, there is situated a double neutral wedge 45, made for example of gray neutral density filter glass, which is movably positioned by drive 52 in the direction of arrows 46 and 47. In this connection, photoconductor 3 is directed toward the one half 45a and the photoconductor 42 toward the other half 45b of the double neutral wedge 45.

If the neutral wedge 45 is moved in the direction of arrow 46, the radiation emitted from the photoconductor 3 to the measuring head 4 is thereby increasingly blocked, while the neutral wedge 45 for the radiation emitted from photoconductor 42 becomes increasingly transmitted. The situation is reversed for the radiations emitted from the two photoconductors 3 and 42 when the gray wedge 45 is moved in the direction of arrow 47.

The double gray wedge may be moved either manually or automatically. The automatic movement is necessary only if the gray wedge is mounted in a position in a particular apparatus which is difficult to reach by the operator because adjustment is not required for each picture to be copied.

For the copying process, the radiation of lamps 20, 21, 22 is regulated in such a manner that the light transmitted through photoconductor 42, both in color composition as well as in intensity, corresponds to that radiation which is transmitted through photoconductor 3 when a comparative negative is copied which has an optimum color distribution and to which all later copies relate. By moving the neutral wedge 45, the light impinging onto measuring head 4 may be influenced in such a manner that a substantially white light containing all primary color components from the photoconductor 42 may be admixed with the actual measuring light coming from the photoconductor 3. The range of possible undercompensation may, with a respective construction of neutral wedge 45, amount to from 0 to 100 percent.

Prints made in accordance with the automatic color printing process and apparatus described in U.S. Pat. No. 3,127,267 may accordingly be undercompensated with respect to any of the primary colors by a suitable regulation of potentiometers 32, 33 and 34 in a manner which provides a suitable predetermined ratio of primary color components in the supplemental light which is independent of the color components of any particular transparency. Different predetermined ratios of primary color components may be established in certain coordinated intensities of the separate sources of supplemental light 20, 21 and 22, which are suitable for certain classes of transparencies actually having an unbalanced primary color format — for example, predominantly green for forest scenes and blue for ocean or seashore scenes. These special formats can be provided to relatively unskilled operators to permit them to readily select the control settings corresponding to predetermined ratios suitable for various classes of transparencies whose prints actually should have unbalanced primary color components for better approximating the color content of the transparency. The word transparency is used herein to designate all forms of photographic transparent images from which prints are made, such negatives or diapositive slides.

I claim:

1. A process for undercompensating the color balance obtained in making colored prints from colored photographic transparencies by a photographic color printing apparatus having a measuring head which terminates the exposures of the printing material to the light of the primary color components in the printing light when predetermined amounts of the printing light of the primary color components transmitted through the transparency are detected by the measuring head, comprising the steps of transmitting the printing light through the transparency onto the measuring head, and impinging supplemental light outside of the printing light on the measuring head together with the printing light transmitted through the transparency, and the supplemental light having primary color components in a predetermined ratio which is independent of the color content of any particular transparency, whereby the balance of the primary color components in the colored prints is undercompensated relative to the predetermined amounts of the primary color components in the printing light which are detected by the measuring head.

2. A process as set forth in claim 1, wherein the ratio of the amounts of printing light and supplemental light impinged on the measuring head is varied for adjusting the degree of undercompensation.

3. A process as set forth in claim 1, wherein the intensity of the supplemental light is varied in accordance with the intensity of the printing light.

4. A process as set forth in claim 3, wherein the intensity of the supplemental light is varied in positive relationship to the intensity of the printing light.

5. A process as set forth in claim 1, wherein the primary color components in the supplemental light are mixed to form substantially white light before impinging them on the measuring head.

6. A process as set forth in claim 1, wherein the predetermined ratio of primary color components in the supplemental light is variable for adjusting the undercompensation.

7. An apparatus for making undercompensated colored prints, from colored photographic transparencies, having a measuring head which terminates exposure of the printing material to the light of the primary color components in the printing light when predetermined amounts of the printing light of the primary color components transmitted through the transparencies are detected by the measuring head comprising means for transmitting the printing light through the transparency from which the prints are being made onto the measuring head, a source of supplemental light having primary color components in a predetermined ratio, and directing means connected with the source of supplemental light for impinging the supplemental light on the measuring head together with the printing light transmitted through the transparency whereby the balance of the primary color components in the colored prints is undercompensated relative to the predetermined amounts of the primary color components in the printing light which are detected by the measuring head.

8. An apparatus as set forth in claim 7, wherein printing and supplemental light conducting means impinge the printing light and supplemental light on the measuring head, and a ratio adjusting means is interposed between the light conducting means and the measuring head whereby the ratio of the amounts of printing light and supplemental light impinged on the measuring head is varied for adjusting the degree of undercompensation.

9. An apparatus as set forth in claim 8, wherein the ratio adjusting means comprises a pair of neutral density wedges.

10. An apparatus as set forth in claim 9, wherein the pair of neutral density wedges are disposed in opposed relationship whereby movement in one direction performs the variation of the ratio of the amounts of printing light and supplemental light impinged on the measuring head.

11. An apparatus as set forth in claim 8, wherein the light conducting means comprises a rod of light conducting material.

12. An apparatus as set forth in claim 7, wherein a photosensitive detecting means is disposed in the path of the printing light passing through the transparency, and light intensity controlling means is connected between the light intensity detecting means and the source of supplemental light whereby the intensity of the source of supplemental light is adjusted in accordance with the printing light transmitted through the transparency.

13. An apparatus as set forth in claim 12, wherein the source of supplemental light is connected to a source of power, the light intensity controlling means comprises a servo control circuit connecting the source of supplemental light to the photosensitive detecting means and to the source of power.

14. An apparatus for making undercompensated colored prints, from colored photographic transparencies, having a measuring head which terminates exposure of the printing material to the light of the primary color components in the printing light when predetermined amounts of the printing light of the primary color components transmitted through the transparencies are detected by the measuring head comprising a source of supplemental light having primary color components in a predetermined ratio, directing means connected with the source of supplemental light for impinging the supplemental light on the measuring head whereby the balance of the primary color components in the colored prints is undercompensated relative to the predetermined amounts of the primary color components in the printing light which are detected by the measuring head, a photosensitive detecting means is disposed in the path of the printing light passing through the transparency, light intensity controlling means is connected between the light intensity detecting means and the source of supplemental light whereby the intensity of the source of supplemental light is adjusted in accordance with the printing light transmitted through the transparency, the source of supplemental light is connected to a source of power, the light intensity controlling means comprises a servo control circuit connecting the source of supplemental light to the photosensitive detecting means and to the source of power, an auxiliary photosensitive element is disposed in the path of the supplemental light, the servo control circuit comprises a differential amplifier means having a pair of connections, one of the connections being connected to the photosensitive detecting means, and the other of the connections being connected to the auxiliary photosensitive element whereby the intensity of the source of supplemental light is controlled.

15. An apparatus as set forth in claim 14, wherein a potentiometer is connected to the servo control circuit for controlling the intensity of the supplemental source of light.

16. An apparatus as set forth in claim 14, wherein separate sources of supplemental light and separate auxiliary photosensitive elements are provided for the primary light components in the supplemental light, and color filters are disposed between each of the separate sources and the measuring head and the auxiliary photosensitive elements whereby the light of the primary color components is emitted upon the measuring head and each of the auxiliary photosensitive elements.

17. An apparatus as set forth in claim 16, wherein light mixing means is provided between the color filters associated with the separate sources of supplemental light and the measuring head whereby primary color components are mixed to provide substantially white light to the measuring head.

18. An apparatus as set forth in claim 17, wherein the servo control circuit has separate servo feedback control circuits with differential amplifier means for each of the separate source of supplemental light.

19. An apparatus as set forth in claim 18, wherein a potentiometer is connected to each of the separate servo control circuits for controlling the intensity of each of the separate supplemental sources of light.

20. An apparatus as set forth in claim 19, wherein another potentiometer is connected between the photosensitive detecting means and the separate sources of supplemental light for adjusting the overall intensity of the sources of supplemental light.

21. An apparatus as set forth in claim 20, wherein the light intensity controlling means also includes a capacitor circuit connected to the photosensitive connecting means for storing a potential which helps govern the overall intensity of light emitted by the separate sources of light.

22. An apparatus as set forth in claim 21, wherein a rectifier is connected to the capacitor circuit to prevent it from discharging until after the exposures are terminated.

23. An apparatus as set forth in claim 21, wherein a discharge switch is provided in the capacitor circuit to discharge it after the exposures are terminated.

24. An apparatus as set forth in claim 14, wherein the light intensity controlling means comprises a capacitor circuit connected to the photosensitive detecting means for storing a potential which helps govern the intensity of light emitted by the source of supplemental light.

25. An apparatus as set forth in claim 24, wherein a rectifier is connected to the capacitor circuit to prevent it from discharging until after the exposures are terminated.

26. An apparatus as set forth in claim 25, wherein a discharge switch is provided in the capacitor circuit to discharge it after the exposures are terminated.

* * * * *